United States Patent [19]

Siewert et al.

[11] Patent Number: 6,104,103

[45] Date of Patent: *Aug. 15, 2000

[54] SIMULTANEOUS POWER SUPPLY SOURCE

[75] Inventors: James Carl Siewert; Clifford L. Allen, both of Mobile, Ala.

[73] Assignee: Ingalls Shipbuilding, Inc., Pascagoula, Miss.

[ * ] Notice: This patent is subject to a terminal disclaimer.

[21] Appl. No.: 09/301,745

[22] Filed: Apr. 29, 1999

Related U.S. Application Data

[63] Continuation of application No. 09/074,399, May 8, 1998, abandoned.

[51] Int. Cl.⁷ .................................................. H02H 3/28
[52] U.S. Cl. ............................ 307/64; 307/66; 307/38; 307/39; 307/85; 364/492; 395/750
[58] Field of Search ................................ 307/64, 66, 85, 307/38, 39; 364/492; 395/750

[56] References Cited

U.S. PATENT DOCUMENTS

| | | | |
|---|---|---|---|
| 2,264,836 | 12/1941 | Garin | 307/64 |
| 3,751,676 | 8/1973 | Igarashi et al. | 307/31 |
| 3,818,237 | 6/1974 | Straus | 307/64 |
| 3,873,846 | 3/1975 | Morio et al. | 307/23 |
| 3,912,940 | 10/1975 | Vince | 307/64 |
| 3,949,238 | 4/1976 | Brookes | 307/64 |
| 4,104,539 | 8/1978 | Hase | 307/64 |
| 4,327,298 | 4/1982 | Burgin | 307/66 |
| 4,659,942 | 4/1987 | Volp | 307/19 |
| 4,670,661 | 6/1987 | Ishikawa | 307/66 |
| 4,673,826 | 6/1987 | Masson | 307/66 |
| 4,760,276 | 7/1988 | Lethellier | 307/18 |
| 4,812,672 | 3/1989 | Cowan et al. | 307/64 |
| 5,151,907 | 9/1992 | Robbins | 364/948.5 |
| 5,428,524 | 6/1995 | Massie | 363/79 |
| 5,473,528 | 12/1995 | Hirata et al. | 307/66 |
| 5,598,041 | 1/1997 | Willis | 307/43 |
| 5,608,273 | 3/1997 | Bartlett | 307/64 |
| 5,892,299 | 4/1999 | Siewert et al. | 307/85 |

*Primary Examiner*—Albert W. Paladini
*Attorney, Agent, or Firm*—Lowe Hauptman Gopstein Gilman & Berner

[57] ABSTRACT

A power transfer system for applying backup electrical power to electrical systems is described which applies backup power automatically without power interruption and which is straightforward to implement and inexpensive to manufacture. The power transfer system has a direct current (DC) power bus as a common supply point for protected electrical equipment, thereby making prior art systems which provide power transfer between alternating current (AC) power sources and typically provide an AC power bus in common with the protected equipment no longer necessary.

24 Claims, 15 Drawing Sheets

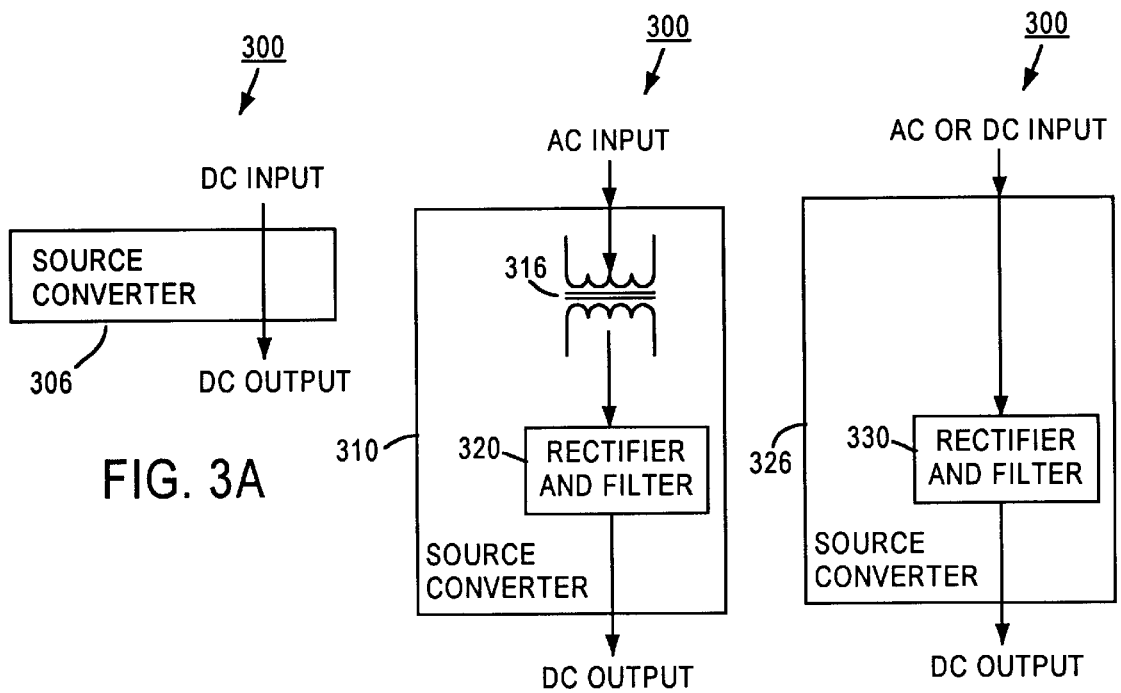
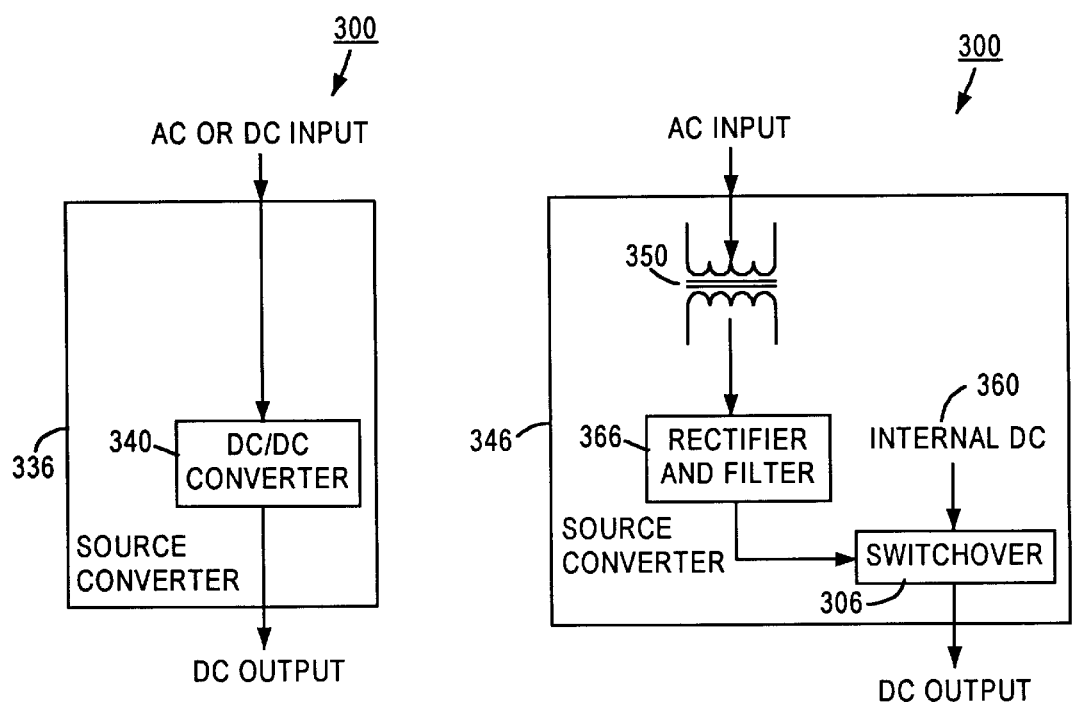

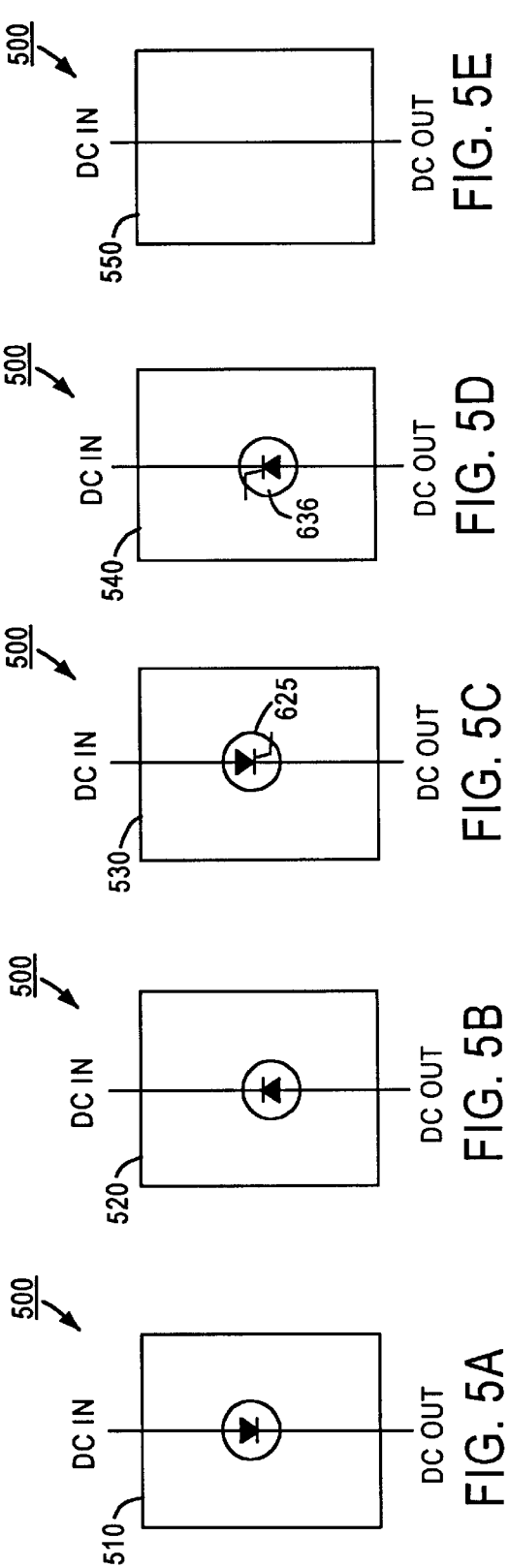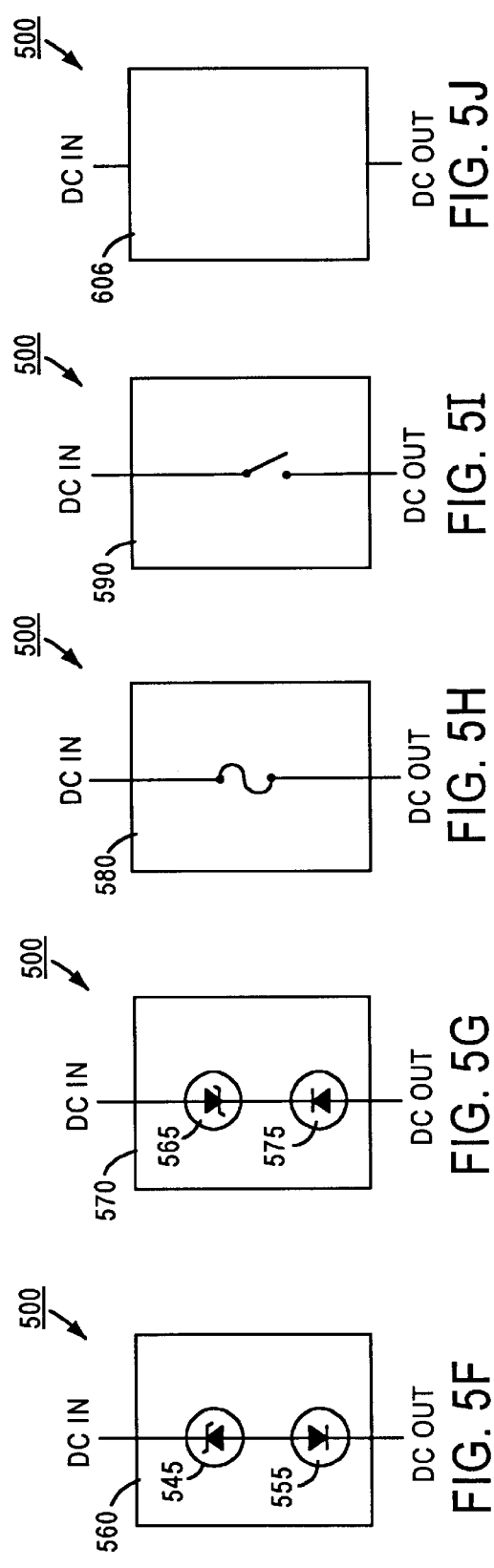

SIMULTANEOUS POWER SUPPLY SOURCE

This application is a continuation of application Ser. No. 09/074,399 filed May 8, 1998 now abandoned.

BACKGROUND OF THE INVENTION

The present invention relates generally to power transfer devices for applying backup electrical power to electrical systems having an internal direct current (DC) bus, and more specifically to a simultaneous power supply source (SPSS) power transfer device for applying backup electrical power to such electrical systems.

Critical electrical equipment in shipboard systems and in other systems must have uninterrupted power and thus is supplied from either a primary power source or a back-up power source upon failure of the primary power source. The transfer between electrical power sources is accomplished by the use of bus power transfer devices. If the normal power source in use fails, the bus power transfer device will accomplish a transfer of electrical power from the normal source to an alternate source of power to ensure that system equipment will continue to receive operating power. There are two types of prior art bus power transfer devices, the automatic bus transfer (ABT) device and the manual bus transfer (MBT) device. The ABT will transfer automatically, while the MBT requires human intervention to accomplish the power transfer.

Prior art ABT devices exhibit power transfer time delays which cause problems when switching to backup power for computers and other sensitive electrical equipment. The problem typically comes about because the time delay before switchover is complete represents an interval of either no power or unacceptable power conditions, during which the protected equipment is in an indeterminate operational condition. This typically means that data may be lost due to degraded power conditions internal to the protected electrical equipment. Additionally, when system power is reapplied after this no-power interval the protected equipment may not be properly configured for a turn-on condition. There are therefore two problems associated with prior art ABT devices: the transfer delay time which results in momentary power loss or unacceptable degradation and the reapplication of power when the protected equipment is in an unknown startup configuration.

Because of these problems with prior art ABT devices, MBT devices may be utilized. The MBT devices are slow because they are manually operated. This is a problem in many applications, but until the present invention the ABT prior art problems have not been successfully resolved. The need for MBT devices comes about because a power interruption can occur during the transfer of the ABT device itself, which places the protected equipment in an unknown startup configurations; if the MBT device is utilized the reapplication of power may be applied properly (but slowly). As a result of prior art power transfer device limitations, prior art power backup transfer systems have the inherent problems described.

Currently there is no known prior art transfer device available that will keep voltage sensitive types of protected equipment on-line operating correctly during power interruptions except for an electronic bus transfer (EBT) device that is projected to be large, complex, heavy and costly, and has not been proven in a shipboard environment. Such an EBT device requires sophisticated electronics which have high maintainability costs and lower reliability in order to accomplish transfer between asynchronous power sources.

There is thus an unmet need in the art to be able to provide the transfer to backup electrical power without the disadvantage of a transfer time delay which would result in a momentary power interruption or momentary degradation which in turn could produce loss of data or unknown equipment configurations. Therefore, it would be advantageous in the art to be able to provide the aforementioned power transfer using a power transfer device which is simple, inexpensive, and will operate automatically while solving the aforementioned problems.

SUMMARY OF THE INVENTION

It is an object of the present invention to describe a power transfer device which will provide transition to backup electrical power for any system equipment having an internal DC bus and in particular for computers and other voltage sensitive shipboard electrical systems without any interruption in electrical power to the protected system equipment.

It is further an object of the present invention to describe such a power transfer device which operates in the described manner while being simple in concept and implementation, inexpensive to manufacture, and provides the required electrical power transfers automatically.

Therefore, according to the present invention, a power transfer system for applying backup electrical power to systems equipment having an internal DC bus is described which applies backup power automatically without power interruption and which is straightforward to implement and inexpensive to manufacture. The power transfer system has a direct current (DC) power bus as a common supply point for protected electrical equipment, thereby making prior art systems which provide power transfer between alternating current (AC) power sources no longer necessary because only one AC source is required. The use of a DC bus allows the use of AC rectifiers and filters on the AC source inputs, and allows the combining of the resultant DC voltages using isolation devices into one DC power bus. The DC power bus output is immune to a primary power source falling below a predetermined voltage level, since the backup source will continue to supply DC power.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawing(s), wherein:

FIG. 5 presents block diagrams of SPSS Isolation Device Configurations with applicability to all embodiments of the present invention;

DESCRIPTION OF THE INVENTION

Currently there is no known power transfer system available which will automatically transfer equipment power to a backup source when the primary power fails in a seamless manner without introducing transients, glitches, and intermittancies which in turn cause data loss, system malfunctions and undefined equipment configurations. The present invention solves these problems in a simple, straightforward and economical manner.

Figure 1:
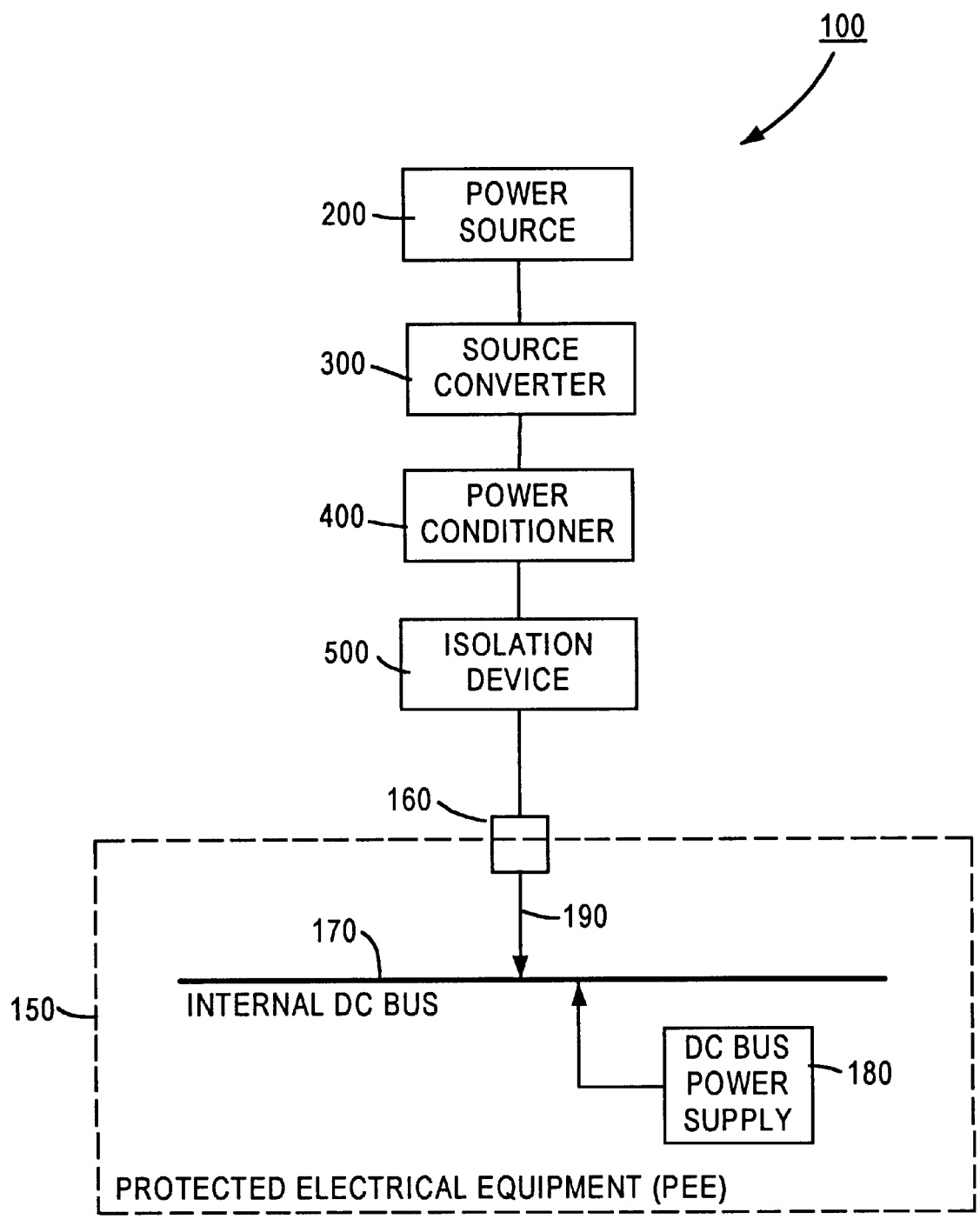
FIG. 1 is a block diagram of a Simultaneous Power Supply Source (SPSS) application with one power source and one Protected Electrical Equipment (PEE), according to a first embodiment of the present invention.
Figure 2A:
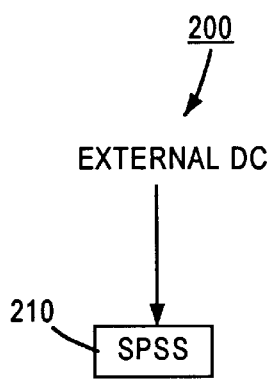
FIG. 2 presents block diagrams of SPSS Power Source Configurations with applicability to all embodiments of the present invention.
Figure 2B:
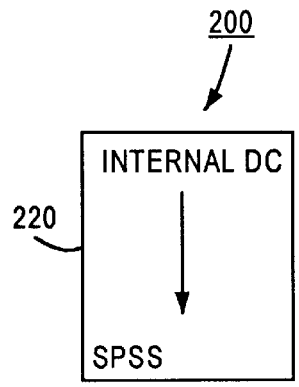
Figure 2C:
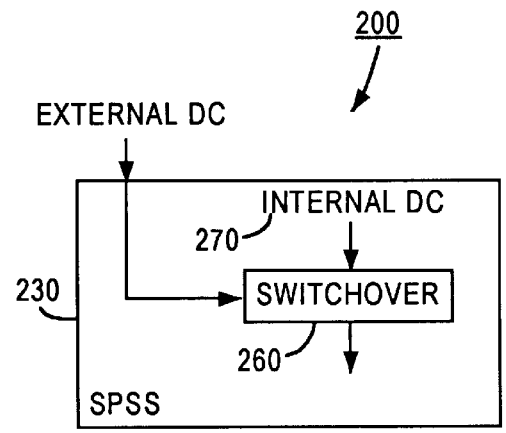
Figure 2D:
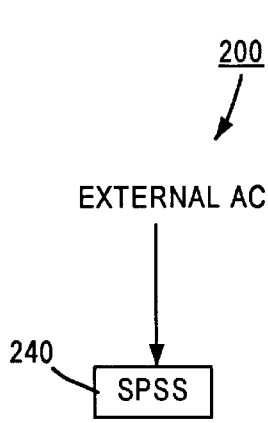
Figure 2E:
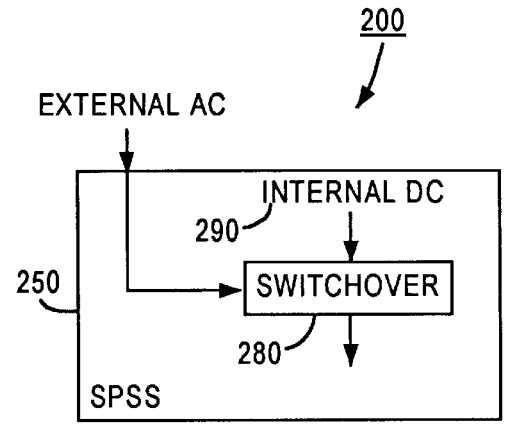
Figure 3F:
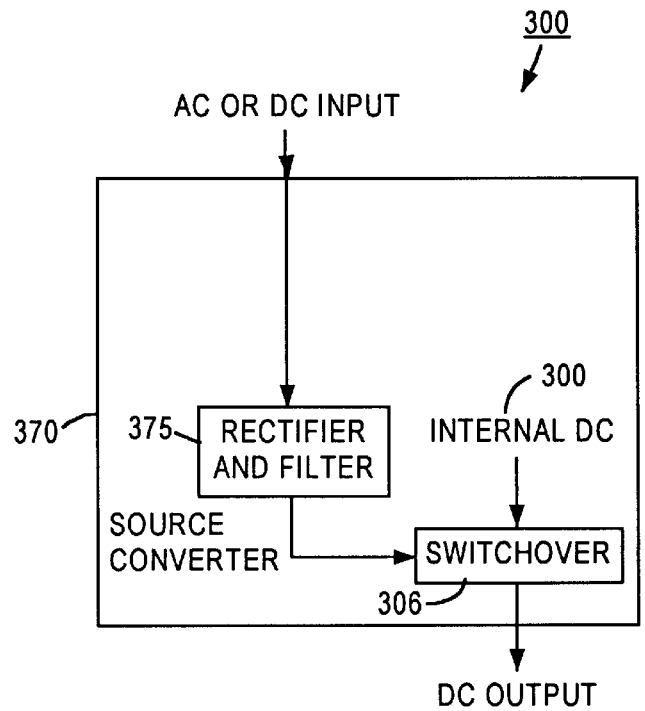
FIG. 3 presents block diagrams of SPSS Source Converter Configurations with applicability to all embodiments of the present invention.
Figure 3G:
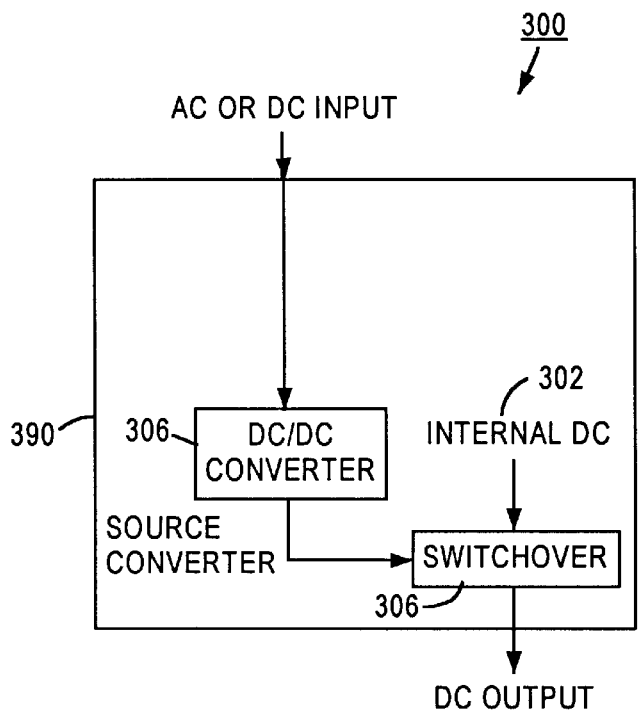
Figures 3H, 3I:
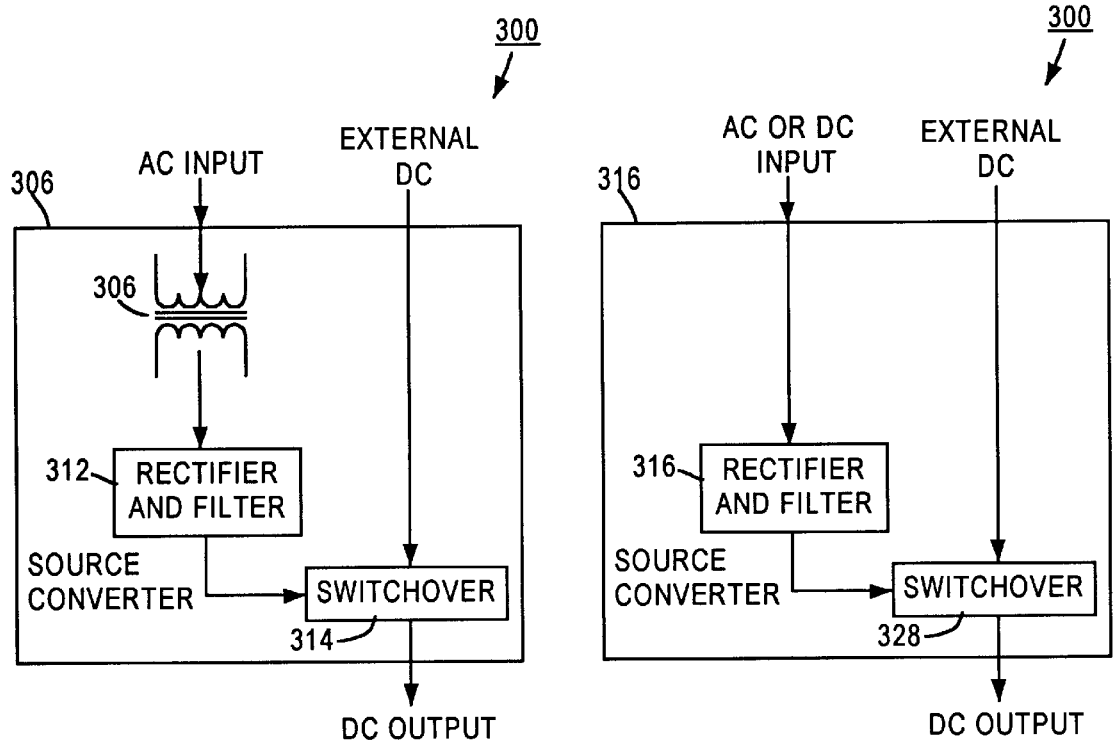
Figure 3J:
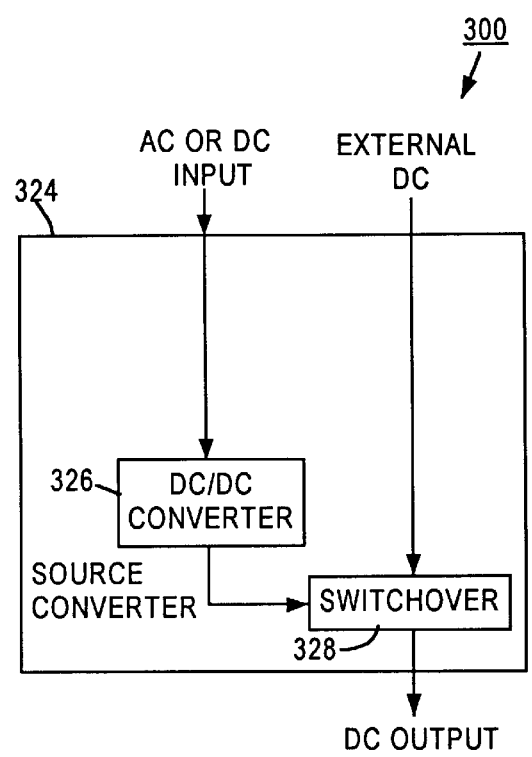
Figure 4A:
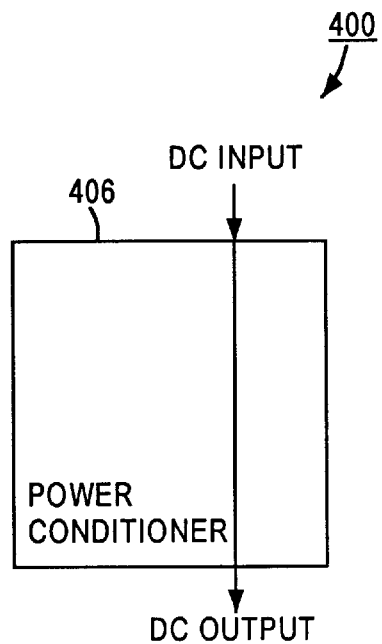
FIG. 4 presents block diagrams of SPSS Power Conditioner Configurations with applicability to all embodiments of the present invention.
Figure 4B:
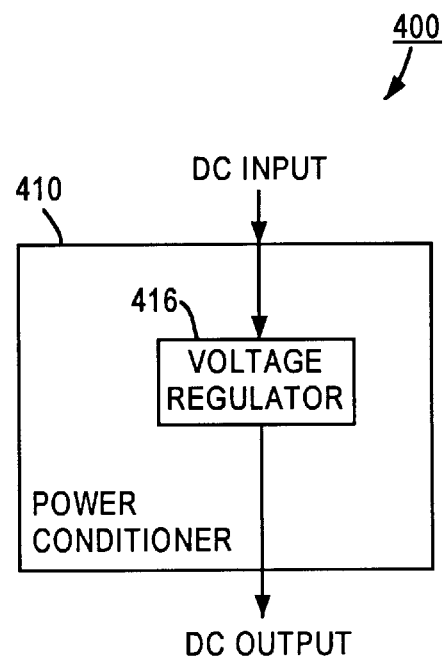
Figure 4C:
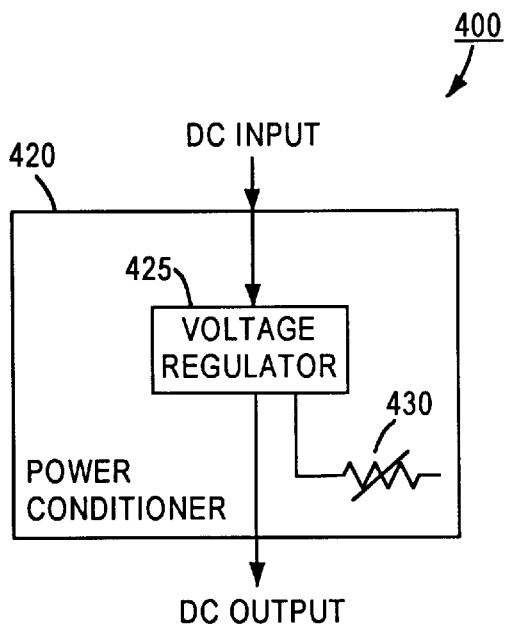
Figure 4D:
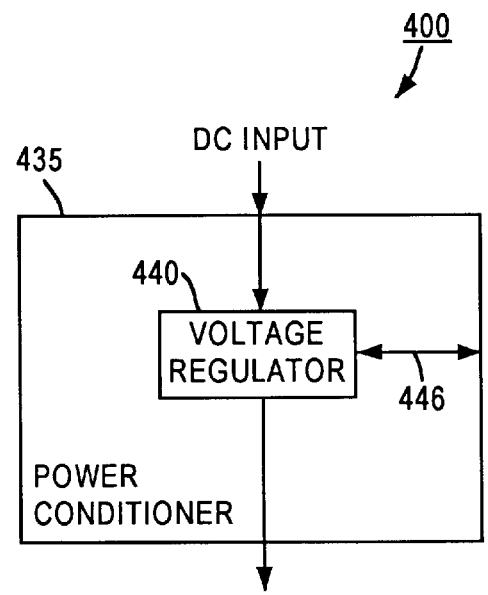
Figure 4E:
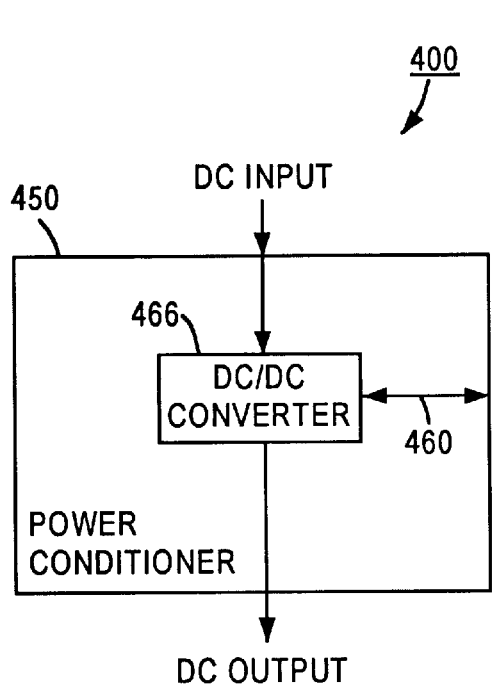
Figure 4F:
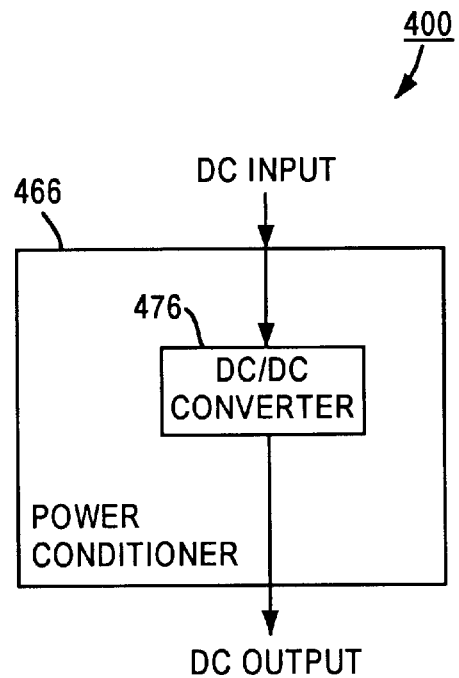
Figure 4G:
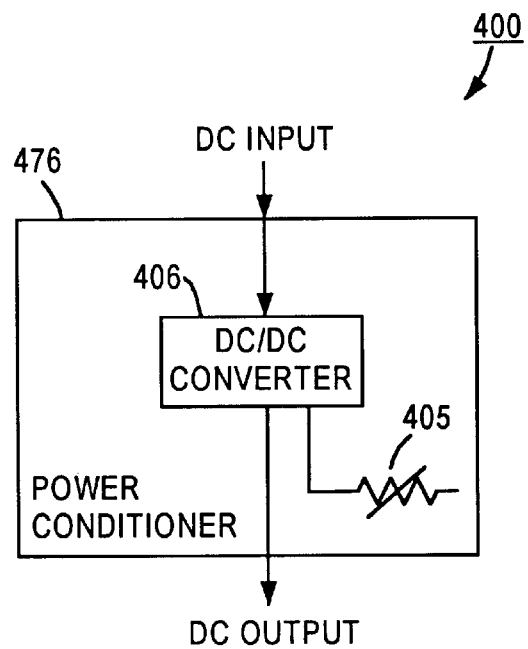

Referring to FIG. 1, Block Diagram 100 represents one application of the SPSS which uses one power source 200 to protect one set of electrical equipment 160. Power Source 200 may be represented by any of the power source configurations presented in FIG. 2, and will be explained in more detail. Source Converter 300 may be represented by any of the source converter configurations presented in FIG. 3, and will be further explained. Power Conditioner 400 may be represented by any of the power conditioner configurations presented in FIG. 4, and will be explained in more detail. Isolation Device 500 may be represented by any of the isolation device configurations presented in FIG. 5, and will be further explained. Protected Electrical Equipment(s) (PEE) 160 is the electrical equipment which is to be protected using the teachings of the present invention.

The portions of Protected Electrical Equipment(s) 160 which relate to the present invention are Internal PEE DC Bus 170 and Internal PEE DC Bus Power Supply 180. Internal PEE DC Bus 170 is an internal DC power bus of Protected Electrical Equipment(s) 160. Internal PEE DC Bus 170 is normally powered internal to Protected Electrical Equipment(s) 160 by Internal PEE DC Bus Power Supply 180. If the AC power source supplying the Internal PEE DC Bus Power Supply 180 fails to provide adequate voltage to Internal PEE DC Bus 170, the required voltage may be supplied external to Protected Electrical Equipment(s) 160 by the SPSS. The external SPSS voltage is applied via Connection 150 and electrical path Connector-to-Bus Path 190. Internal PEE DC Bus Power Supply 180 typically receives operating power from an ac or dc mains (primary) power source.

In the remainder of this specification, reference is frequently made to Protected Electrical Equipment(s) 160. It is important to interpret each reference to Protected Electrical Equipment(s) 160 as a reference to a generic unit of electrical equipment which contains an internal electrical power bus (Internal PEE DC Bus 170), which normally receives internal electrical power from some source (Internal PEE DC Bus Power Supply 180), and within which physical electrical access may be obtained to Internal PEE DC Bus 170 by existing means or by modification to Protected Electrical Equipment(s) 160 with either method depicted as Connection 150 and Connector-to-Bus Path 190.

Connection 150 may or may not be available at Protected Electrical Equipment(s) 160 depending on equipment design. If Connection 160 is not normally available, Protected Electrical Equipment(s) 160 may be modified to allow for Connection 150 and Connector-to-Bus Path 190. The details of a particular modification to any given Protected Electrical Equipment(s) 160 will vary from one type of protected electrical equipment to another. Since Protected Electrical Equipment(s) 160 modification details are not required to describe the present invention, no attempt to include them is made here. It is sufficient to note that if physical access to Internal PEE DC Bus 170 has not been provided by the equipment manufacturer, in many cases it can be provided by modifying Protected Electrical Equipment(s) 160 to effect the inclusion of Connection 150. Connector-to-Bus Path 190 is the electrical connection between Connection 150 and Internal PEE DC Bus 170, and will be provided as part of the modification if not provided by the equipment manufacturer.

Isolation Device 500 performs the function of allowing current from the SPSS to flow toward Internal PEE DC Bus 170 only if the voltage on Internal PEE DC Bus 170 drops below a predetermined voltage level, but otherwise maintaining electrical isolation between the SPSS and Protected Electrical Equipment(s) 160. An example of Isolation Device 500 is a silicon diode, which will only allow current flow from Power Conditioner 400 to Internal PEE DC Bus 170 if the voltage differential across the silicon diode increases to approximately 0.7 VDC. If the voltage differential is less than approximately 0.6 VDC current will not flow between Power Conditioner 400 and Internal PEE DC Bus 170, thereby causing the SPSS to be isolated from the Protected Electrical Equipment(s) 160. Other possible configurations of Isolation Device 500 are illustrated in FIG. 5.

Power Source 200, Source Converter 300 and Power Conditioner 400 serve to translate an SPSS mains power source to the requirements of Internal PEE DC Bus 170, for example 12 VDC. Source Converter 300 in this example may be a traditional transformer, rectifier and filter circuit, and Power Conditioner 400 may be a voltage regulator which furnishes 12 VDC from the higher DC voltage output of Source Converter 300. Other possible configurations of Source Converter 300 and Power Conditioner 400 are illustrated in FIGS. 3 and 4, respectively.

Power Source 200 may be represented by any of the Power Source configurations shown in FIG. 2. Source Converter 300 may be represented by any of the Source Converter configurations shown in FIG. 3. Power Conditioner 400 may be represented by any of the Power Conditioner configurations shown in FIG. 4, and Isolation Device 500 may be represented by any of the Isolation Device configurations shown in FIG. 5. The choice of exact configurations will of course depend upon design requirements of specific applications.

The different configurations available for Power Source 200, Source Converter 300, Power Conditioner 400 and Isolation Device 500 will now be discussed. Referring to FIG. 2, Power Source 200 presents a multiplicity of different power source configurations 210, 220, 230, 240, and 250 which may be utilized in any of the embodiments of the present invention shown in FIGS. 1 and 6 to 12 for SPSS operation. Power Source Configuration 210 allows for direct application of an external DC source to the SPSS, while Power Source Configuration 240 allows for direct application of an external AC source to the SPSS. Power Source Configuration 220 depicts SPSS operation from an internal SPSS battery.

Power Source Configuration 230 illustrates how the SPSS may be powered by an external DC source or by Internal DC Source 270, with voltage selection between the two being accomplished by Internal/External Switchover 260. Control of Internal/External Switchover 260 may be accomplished by manual, automatic or semiautomatic means (not shown) depending on system requirements. Power Source Configuration 250 illustrates how the SPSS may be powered by an external AC source or by Internal DC Source 290, with voltage selection between the two being accomplished by Internal/External Switchover 280. Control of Internal/External Switchover 280 may be accomplished by manual, automatic or semiautomatic means (not shown) depending on system requirements.

In the remainder of this specification, reference is frequently made to Power Source 200. It is important to interpret each reference to Power Source 200 as a reference to any and all power source configurations shown in FIG. 2 which are electrically viable for a given application.

Referring to FIG. 3, Source Converter 300 presents a multiplicity of source converter configurations 305, 306, 310, 316, 324, 325, 335, 345, 370, 390 which may be utilized for SPSS operation in any of the embodiments of the present invention shown in FIGS. 1 and 6 to 12. The purpose of a source converter is to modify the output of Power Source 200 into a more usable form of electrical energy. As an example, a source converter may transform AC, output by Power Source 200, to DC which is then utilized for subsequent SPSS operation.

Source Converter Configuration 305 allows for the direct unchanged transmission of input to output. Source Converter Configuration 310 allows for the transformation of an AC input power into DC output power. Source Converter Configuration 310 depicts a traditional method for accomplishing this, utilizing Transformer 315 and Rectifier and Filter 320. One skilled in the art, however, will recognize that the transformation of the AC input power into DC output power may be accomplished by means other than by Transformer 315 and Rectifier and Filter 320.

Source Converter Configuration 325 allows for the transformation of an input signal which may be either AC or DC into a DC output power signal. Source Converter Configuration 325 depicts a traditional method for accomplishing this utilizing Rectifier and Filter 330, although one skilled in the art may accomplish this transformation by other means.

Source Converter Configuration 335 allows for the transformation of an AC or DC input power signal into a DC output power signal. Source Converter Configuration 335 depicts a traditional method for accomplishing this utilizing DC/DC Converter 340, although one skilled in the art may accomplish this transformation by other means.

Source Converter Configuration 345 allows for the transformation of an AC input signal into a DC output signal while providing for a secondary power source changeover if required by system operational requirements. Source Converter Configuration 345 depicts a traditional method for accomplishing this utilizing Transformer 350, Rectifier and Filter 355, Internal DC Source 360, and Internal/External Switchover 365, although one skilled in the art may accomplish this transformation by other means. Control of Internal/External Switchover 365 may be accomplished by manual, automatic or semiautomatic means (not shown) depending on system requirements.

Source Converter Configuration 370 allows for the transformation of an AC or DC input power signal into a DC output power signal while providing for a secondary power source changeover if required depending on system operational requirements. Source Converter Configuration 370 depicts a traditional method for accomplishing this utilizing Rectifier and Filter 375, Internal/External Switchover 385, and Internal DC Source 380, although one skilled in the art may accomplish this transformation by other means. Control of Internal/External Switchover 385 may be accomplished by manual, automatic or semiautomatic means (not shown) depending on system requirements.

Source Converter Configuration 390 allows for the transformation of an AC or DC input signal into a DC output signal while providing for a secondary power source changeover if required depending on system operational requirements. Source Converter Configuration 390 depicts a traditional method for accomplishing this utilizing DC/DC Converter 395, Internal DC Source 302, and Internal/External Switchover 304, although one skilled in the art may accomplish this transformation by other means. Control of Internal/External Switchover 304 may be accomplished by manual, automatic or semiautomatic means (not shown) depending on system requirements.

Source Converter Configuration 306 allows for the transformation of an AC input signal into DC output power while providing for an external secondary power source changeover if required depending on system operational requirements. Source Converter Configuration 306 depicts a traditional method for accomplishing this utilizing Transformer 308, Rectifier and Filter 312, and 314, although one skilled in the art may accomplish this transformation by other means. Control of 314 may be accomplished by manual, automatic or semiautomatic means (not shown) depending on system requirements.

Source Converter Configuration 316 allows for the transformation of an AC or DC input power into DC output power while providing for an external secondary power source changeover if required depending on system operational requirements. Source Converter Configuration 316 depicts a traditional method for accomplishing this utilizing 318 and Internal/External Switchover 322, although one skilled in the art may accomplish this transformation by other means. Control of Internal/External Switchover 322 may be accomplished by manual, automatic or semiautomatic means (not shown) depending on system requirements.

Source Converter Configuration 324 allows for the transformation of an AC or DC input power signal into a DC output power signal while providing for an external secondary power source changeover if required depending on system operational requirements. Source Converter Configuration 324 depicts a traditional method for accomplishing this utilizing DC/DC Converter 326 and Internal/External Switchover 328, although one skilled in the art may accomplish this transformation by other means. Control of Internal/External Switchover 328 may be accomplished by manual, automatic or semiautomatic means (not shown) depending on system requirements.

In the remainder of this specification, reference is frequently made to Source Converter 300. It is important to interpret each reference to Source Converter 300 as a reference to any and all source converter configurations shown in FIG. 3 which are electrically viable for a given application.

Referring to FIG. 4, Power Conditioner 400 presents a multiplicity of power conditioner configurations 405, 410, 420, 435, 450, 465, 475 which may be utilized for SPSS operation in any of the embodiments of the present invention shown in FIGS. 1 and 6 to 12. The purpose of a power conditioner is to modify a DC input so as to obtain a desired DC output level. As an example, a power conditioner may transform 28 VDC unregulated into 5 VDC regulated, to be utilized in ensuing SPSS operation. As another example, a power conditioner may transform 28 VDC unregulated into a regulated adjustable output of 2–20 VDC.

Power conditioner configurations 405, 410, 420, 435, 450, 465, 475 will now be described. Power Conditioner Configuration 405 allows for a DC input to be applied as a DC output unchanged. Power Conditioner Configuration 410 allows for the transformation of a DC input power signal into a regulated DC output power signal. This is accomplished by Voltage Regulator 415. Power Conditioner Configuration 420 allows for the transformation of a DC input power signal into a variable regulated DC output power signal. This is accomplished by Voltage Adjustment 430 of Adjustable Voltage Regulator 425.

Power Conditioner Configuration 435 allows for the transformation of a DC input power signal into a variable regulated DC output power signal. This is accomplished by Voltage Regulator 440 which has Voltage Regulator Control 445. Voltage Regulator Control 445 can accept external inputs to Voltage Regulator 440 for control of DC output voltage and control of current limiting, and can provide input levels to external equipment indicative of status and output DC voltage and current.

Power Conditioner Configuration 450 allows for the transformation of a DC input power signal into a variable regulated DC output power signal. This is accomplished by DC/DC Converter 455 which has DC/DC Converter Control 460. DC/DC Converter Control 460 can accept external inputs to DC/DC Converter 455 for control of DC output voltage and control of current limiting, and can provide power to external equipment indicative of status and output DC voltage and current.

Power Conditioner Configuration 465 allows for the transformation of DC input power into a different regulated DC output power. This is accomplished by DC/DC Converter 470. Finally, Power Conditioner Configuration 475 allows for the transformation of a DC input signal into a variable regulated DC output signal. This is accomplished by Variable DC/DC Converter 480 which has DC/DC Converter Adjustment 485.

In the remainder of this specification, reference is frequently made to Power Conditioner 400. It is important to interpret each reference to Power Conditioner 400 as a reference to any and all power conditioner configurations shown in FIG. 4 which are electrically viable for a given application.

Referring to FIG. 5, Isolation Device Configuration 500 presents a multiplicity of isolation device configurations 505, 510, 520, 530, 540, 550, 560, 570, 580, 590 which may be utilized for SPSS operation in any of the embodiments of the present invention shown in FIGS. 1 and 6 to 12. The purpose of an isolation device is to electrically isolate the DC input from the DC output. This is important in the present invention because the protected equipment power bus must not be affected by the SPSS unless a fault occurs and the SPSS is required to supply bus power. An example of an isolation device is a diode.

Isolation Device Configuration 510 allows for electrical isolation to be accomplished by an electrical diode in a forward direction. Isolation Device Configuration 520 allows for electrical isolation to be accomplished by an electrical diode in the reverse direction for negative voltage buses. Isolation Device Configuration 530 allows for electrical isolation to be accomplished by a Silicon Controlled Rectifier (SCR), with a control means, in the forward direction. SCR 525 is controlled by signals which are determined by system requirements. Isolation Device Configuration 540 allows for electrical isolation to be accomplished by a SCR, with a control means, in the reverse direction for negative voltage buses. SCR 535 is controlled by signals which are determined by system requirements. Isolation Device Configuration 550 allows for an isolation device with minimal isolation characteristics.

Isolation Device Configuration 560 allows for electrical isolation to be accomplished by an electrical diode combination which furnishes isolation in the reverse direction and voltage-delayed conduction in the forward direction. This is accomplished by the series combination of Zener Diode 545 and Diode 555. An example is 3.3 V for Zener Diode 545, and a silicon diode 555. The combination will provide isolation in the reverse direction and in the forward direction until the protected equipment power bus voltage decreases by about 3.9 VDC, at which time current in the forward direction will flow. One skilled in the art will recognize other means to achieve the same result.

Isolation Device Configuration 570 allows for electrical isolation to be accomplished by an electrical diode combination which furnishes isolation in the forward direction and voltage-delayed conduction in the reverse direction for negative voltage buses. This is accomplished by the series combination of Zener Diode 565 and Diode 575. An example is a 3.3 V zener for Zener Diode 565, and a silicon diode for Diode 575. The combination will provide isolation in the forward direction and in the reverse direction until the protected equipment power bus voltage decreases by about—3.9 VDC, at which time current in the reverse direction will flow. One skilled in the art will recognize other means to achieve the same result.

Isolation Device Configuration 580 allows for an isolation device with minimal isolation characteristics but which will provide overcurrent protection.

Isolation Device Configuration 590 allows for an isolation device with minimal isolation characteristics but which will provide a current interrupt capability. The current interrupt capability may be either automatic, as in a circuit breaker, or manual as with a switch, depending upon system requirements. The current interrupt may also be achieved by an electronically controlled switch, wherein the electronic control signal operation is dependent on system requirements.

Isolation Device Configuration 505 allows for an isolation device which is composed of the electrical connection of any electrically viable combination of Isolation Device 500. As an example, it may be desirable to combine a fuse (Isolation Device Configuration 580) with a diode (Isolation Device Configuration 510) and a switch (Isolation Device Configuration 590).

In the remainder of this specification, reference is frequently made to Isolation Device 500. It is important to interpret each reference to Isolation Device 500 as a reference to any and all isolation device configurations shown in FIG. 5 which are electrically viable for a given application.

Figure 6:
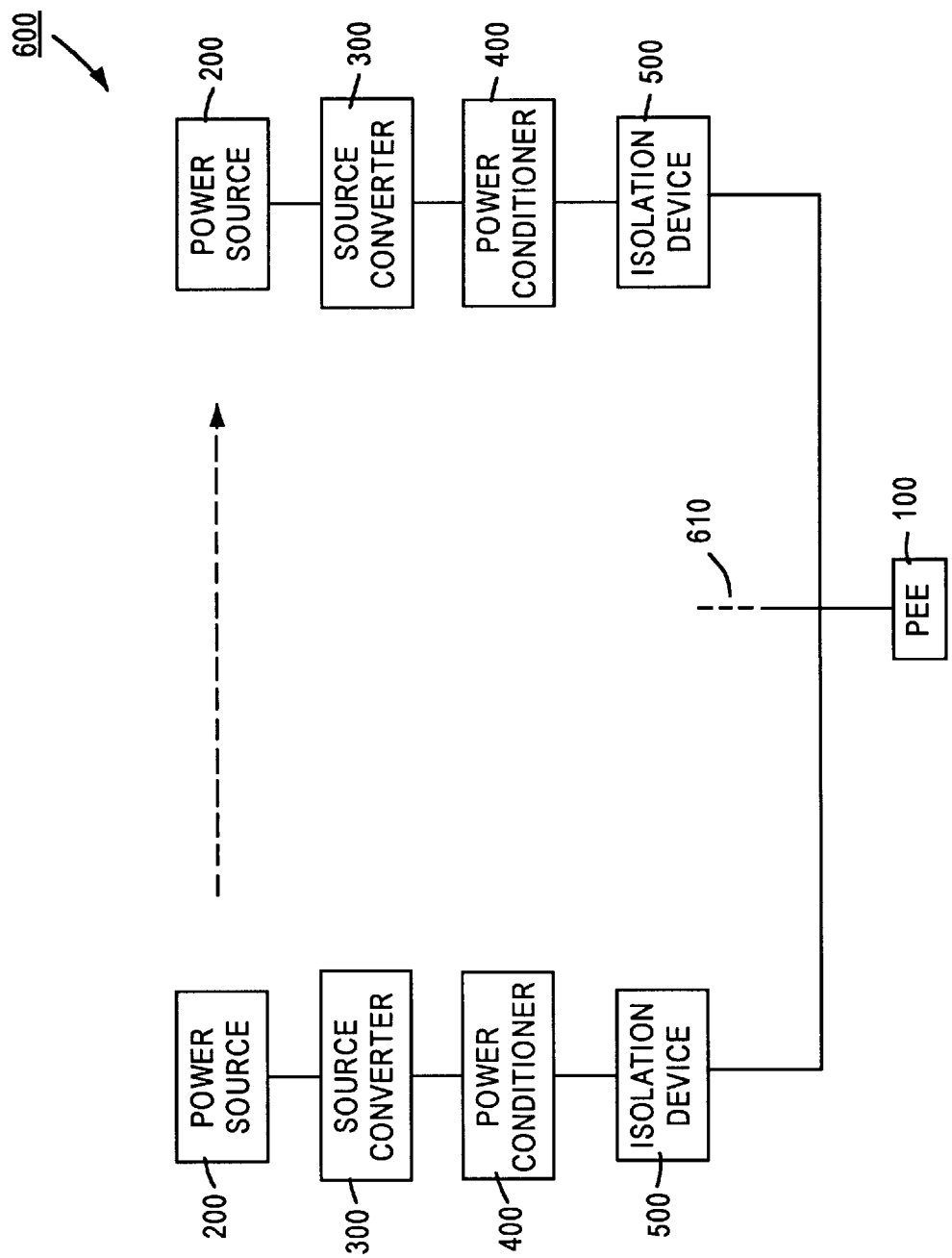
FIG. 6 is a block diagram of a SPSS application with one to N power sources and one PEE, according to a second embodiment of the present invention.

Referring to FIG. 6, Block Diagram 600 represents the protection of one Protected Electrical Equipment(s) 160 using a multiplicity of power source paths for each Power Source 200 that is used, according to a second embodiment of the present invention. Any number of Power Sources 200 may be utilized as indicated by the dashed line and Power Sources I to N. Each Power Source is connected to Protected Electrical Equipment(s) 160 by a series connection of Source Converter 300, Power Conditioner 400 and Isolation Device 500 to form a power source path. Only the first and last paths are shown, and all others are indicated by Other Paths 610. The output of each Isolation Device 500 is connected to a common circuit which is connected to Protected Electrical Equipment(s) 160.

If the voltage on Internal PEE DC Bus 170 (internal to Protected Electrical Equipment(s) 160 as shown in FIG. 1) decreases sufficiently so that it is less than a predetermined voltage level, then power to Internal PEE DC Bus 170 can be supplied from any active Power Source 200. If any Power Source 200 is not active, Internal PEE DC Bus 170 is unaffected because of the isolation afforded by Isolation Device 500. The extent to which a particular Power Source 200 is supplied Internal PEE DC Bus 170 power is determined by the particular path design, consisting of Power Source 200, Source Converter 300, Power Conditioner 400 and Isolation Device 500, and should be based on system requirements. A certain Power Source 200 can be selected to supply power to Internal PEE DC Bus 170 first, and other Power Sources 200 will supply power to Internal PEE DC Bus 170 only if the voltage on Internal PEE DC Bus 170 continues to decrease below the predetermined acceptable voltage level. As an example, backup AC sources which are active can be selected to supply power first, and only if these AC sources are unavailable or insufficient will secondary active battery backup sources be utilized.

Figure 7:
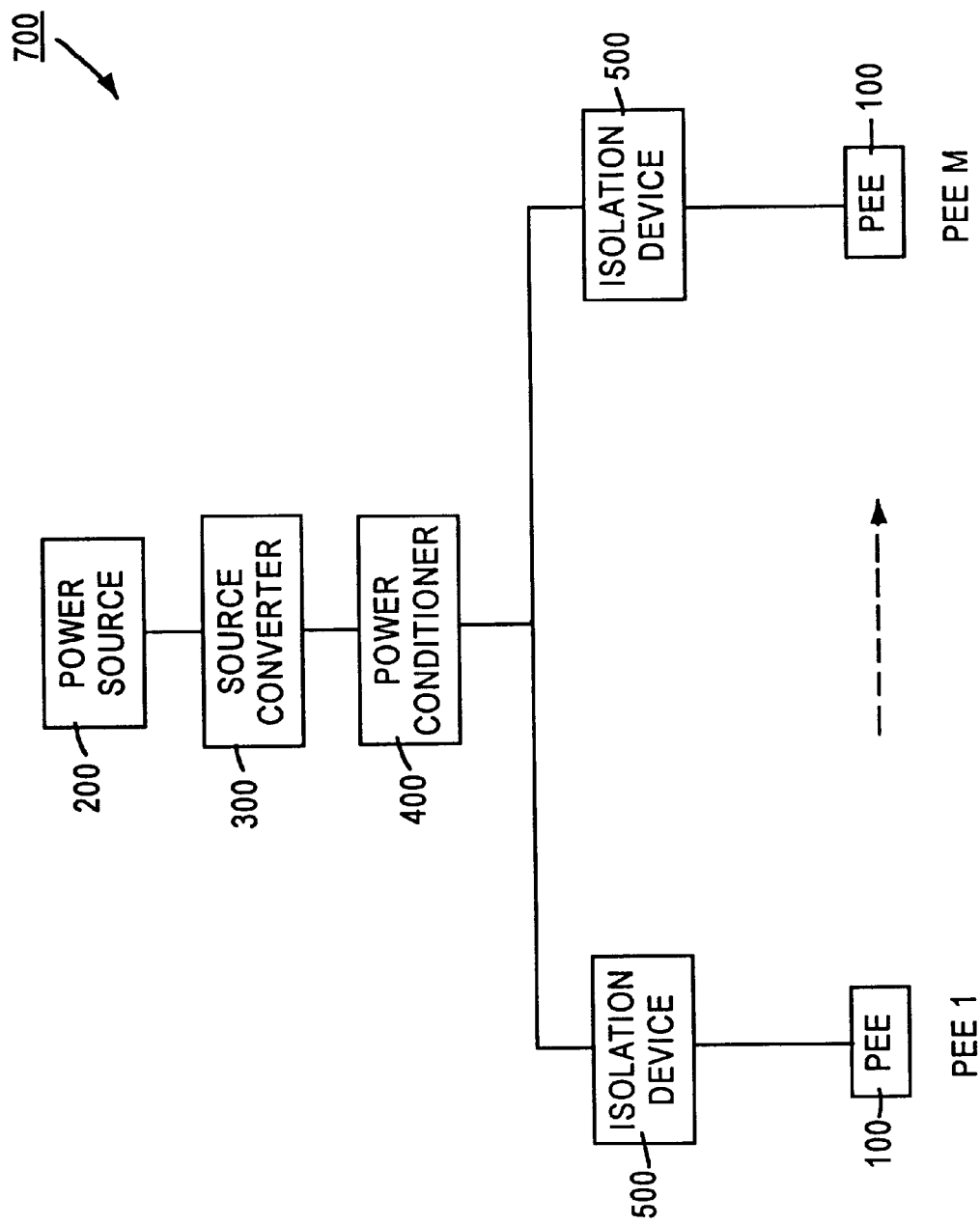
FIG. 7 is a block diagram of a SPSS application with one power source and one to M PEE, according to a third embodiment of the present invention.

Referring to FIG. 7, Block Diagram 700 represents the protection of any number of Protected Electrical Equipment(s) 160 from a single Power Source 200, according to a third embodiment of the present invention. Multiple Protected Electrical Equipment(s) 160 may be simultaneously protected, and this is represented by the dashed line between PEE I and PEE M. The Power Source 200 is routed to a Source Converter 300 and a Power Conditioner 400. The output of Power Conditioner 400 is connected in parallel to as many Isolation Devices 500 as there are Protected Electrical Equipment(s) 160. This is to isolate the electrical state of any Protected Electrical Equipment(s) 160 from affecting the electrical state of the SPSS, and adversely affecting its ability to provide protective electrical power to the other Protected Electrical Equipment(s) 160.

Figure 8:
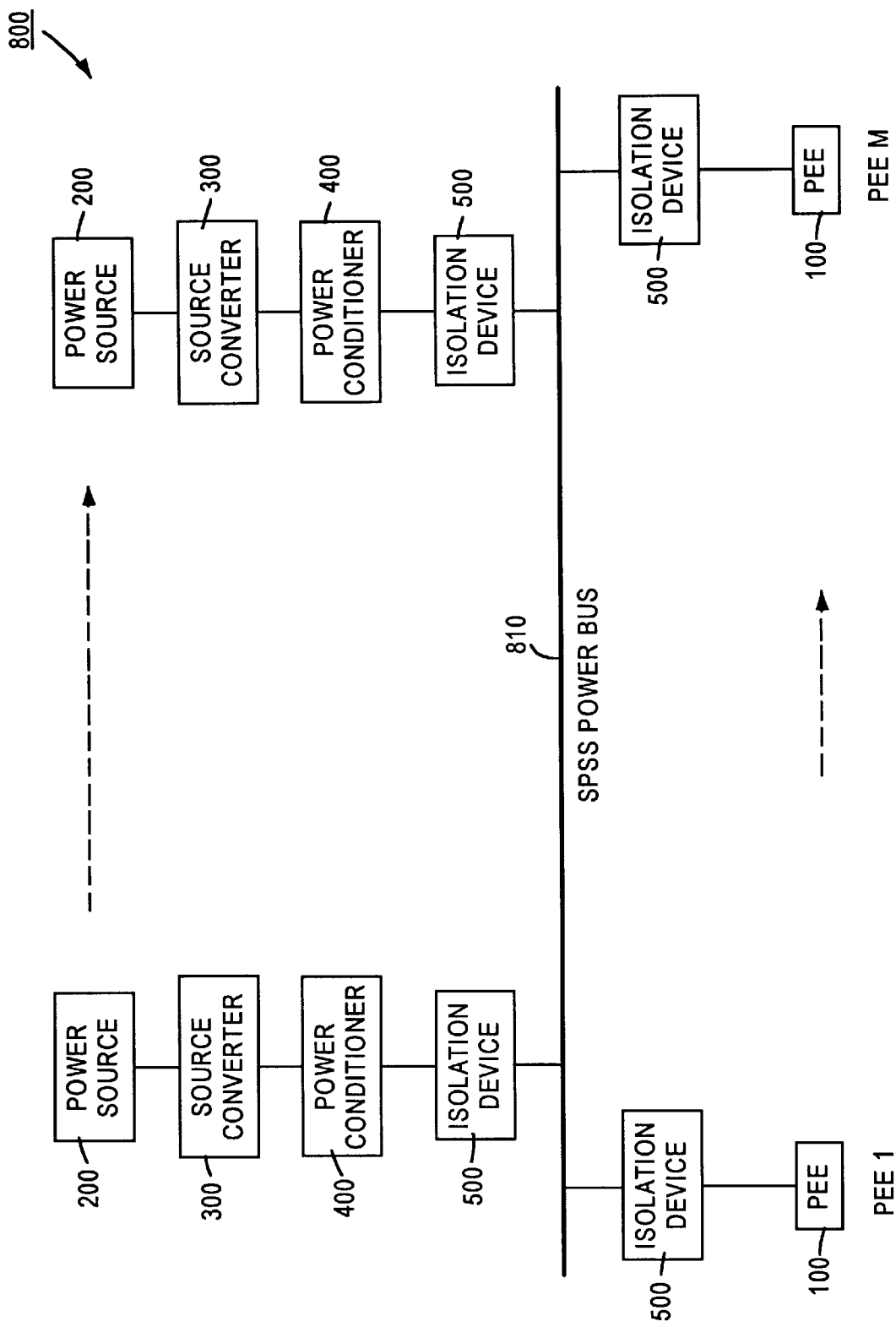
FIG. 8 is a block diagram of a SPSS application with one to N power sources and one to M PEE, according to a fourth embodiment of the present invention.

Referring to FIG. 8, Block Diagram 800 depicts the use of any number of Power Sources 200 to supply backup electrical power to any number of Protected Electrical Equipment(s) 160, according to a fourth embodiment of the present invention. The multiplicity of Power Sources 200 are identified as I to N with the dashed line indicating path locations. The multiplicity of Protected Electrical Equipment(s) 160 is indicated by PEE 1 to PEE M, with their path locations indicated by a dashed line. The numbers N and M may be different. A single input power source path consists of the series connection of Power Source 200, Source Converter 300, Power Conditioner 400, and Isolation Device 500. SPSS Power Bus 810 is formed by the parallel connection of the outputs of all Isolation Devices 500 of each input power source path. SPSS Power Bus 810 is used to drive M parallel Isolation Device 500 inputs, with each Isolation Device 500 M output connected to a Protected Electrical Equipment(s) 160. The use of a Isolation Device Configuration 500 with each Protected Electrical Equipment(s) 160 prevents any Protected Electrical Equipment(s) 160 from adversely affecting SPSS Power Bus 810, while the use of an Isolation Device 500 as the output device in each input power path prevents an inactive Power Source 200 from adversely affecting SPSS Power Bus 810.

Figure 9:
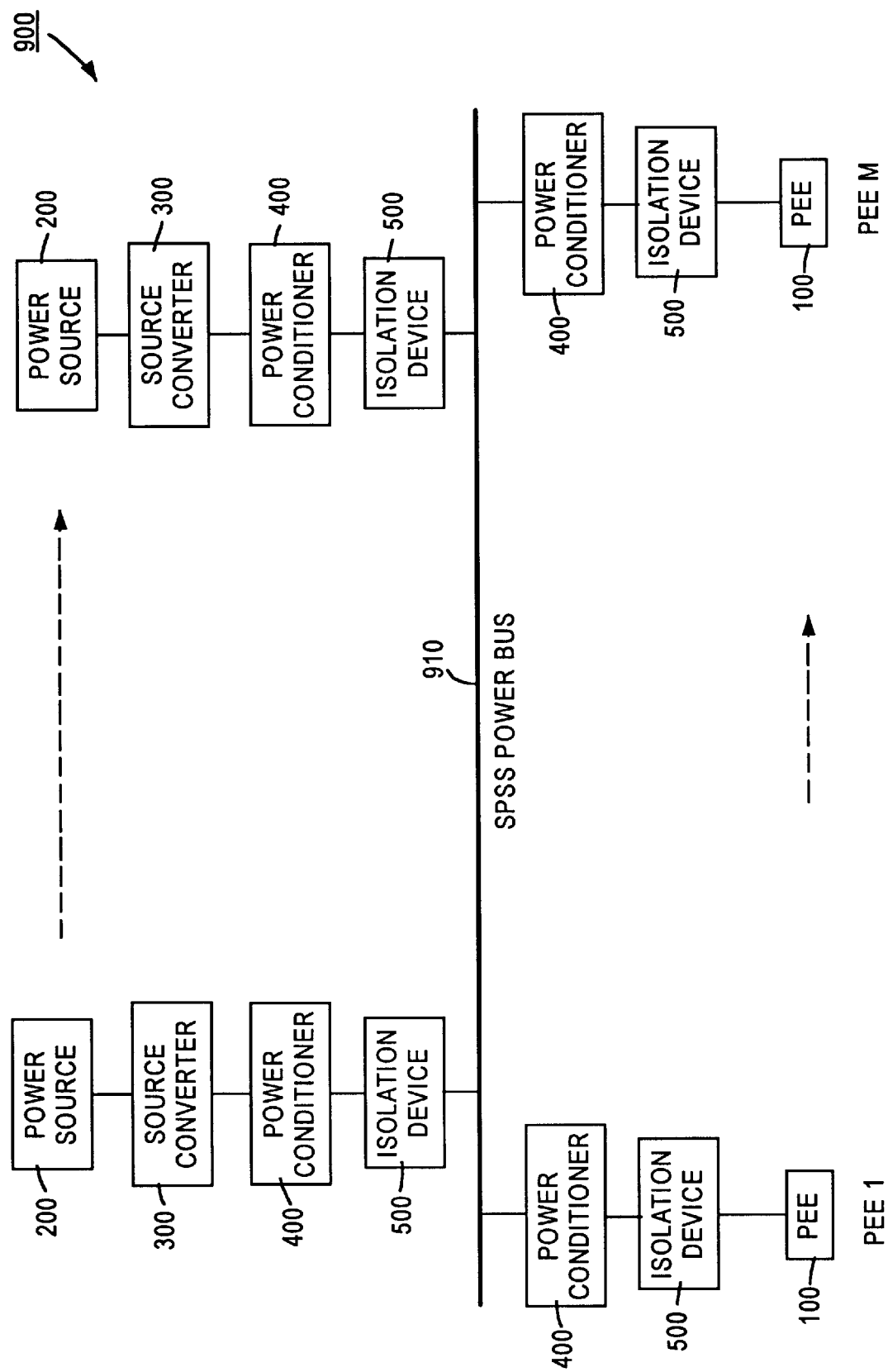
FIG. 9 is a block diagram of a SPSS application with one to N power sources and one to M PEE, according to a fifth embodiment of the present invention.

Referring to FIG. 9, Block Diagram 900 illustrates the use of any number of Power Source 200 to supply backup electrical power to any number of Protected Electrical Equipment(s) 160 wherein the backup voltage supplied to any Protected Electrical Equipment(s) 160 may be different from that supplied to any other Protected Electrical Equipment(s) 160, according to a fifth embodiment of the present invention. This is accomplished by the inclusion of a multiplicity of Power Conditioners 400 with the input of each Power Conditioner 400 connected to SPSS Power Bus 910 in common parallel manner, and with the output of each Power Conditioner 400 connected to Isolation Device 500 and Protected Electrical Equipment(s) 160 in a serial manner. Operation of all other aspects of Block Diagram 900 is otherwise similar to the operation of Block Diagram 800. As an example, the voltage of SPSS Power Bus 910 may be 24 VDC, the voltage to PEE 1 may be 5 VDC, the voltage to PEE 2 may be 12 VDC, the voltage to PEE 3 may be −15 VDC, etc. In this example the power sources may be Source 1=120 VAC, Source 2=48 VDC, etc.

Figure 10:
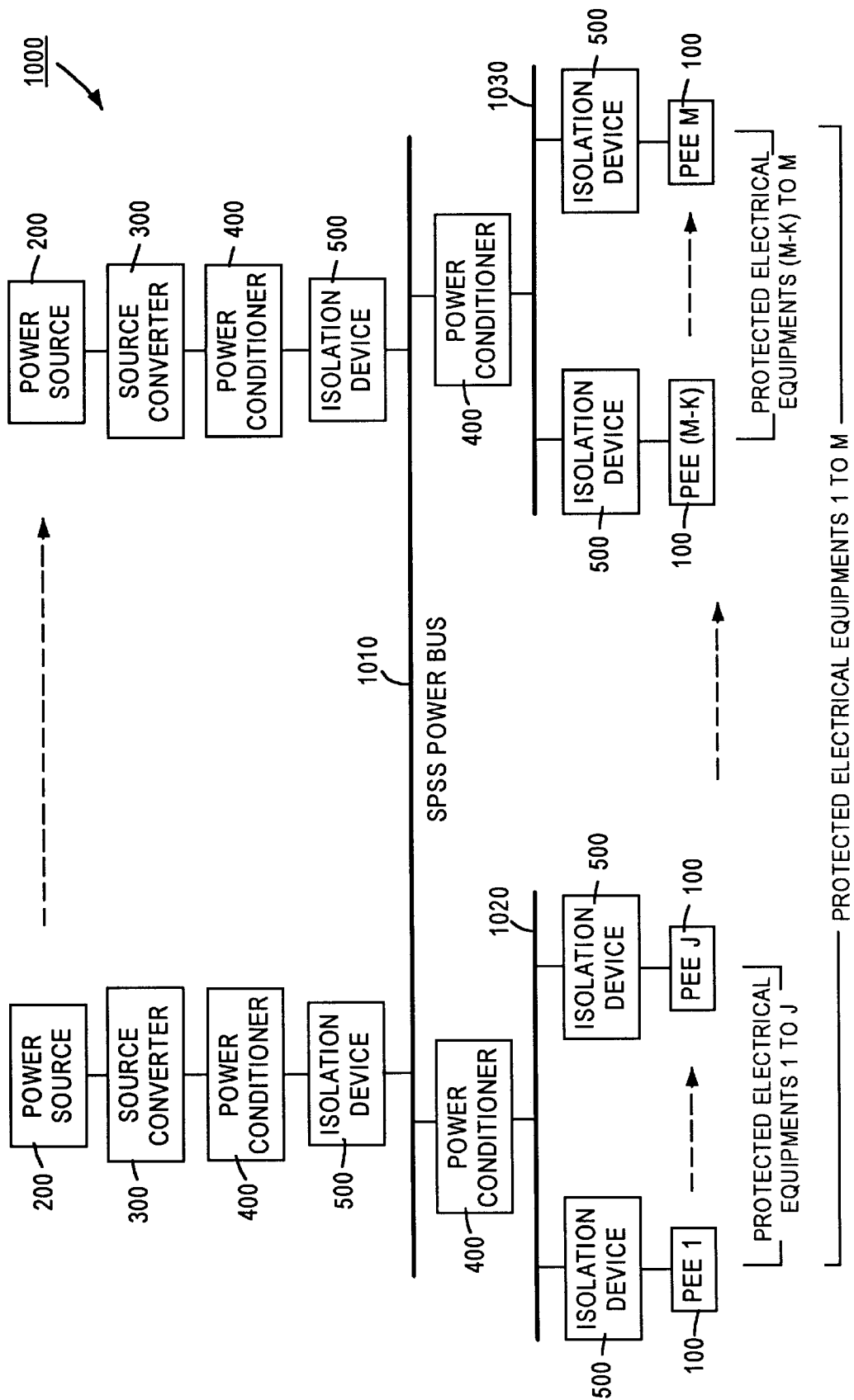
FIG. 10 is a block diagram of a SPSS application with one to N power sources and one to M PEE, according to a sixth embodiment of the present invention.

Referring to FIG. 10, Block Diagram 1000 presents an SPSS which utilizes any number of Power Sources 200 1 . . . N to protect any number of Protected Electrical Equipment(s) 160 1 . . . M, according to a sixth embodiment of the present invention. In operation this arrangement is very similar to that described for Block Diagram 900, except that all Protected Electrical Equipment(s) 160 with common voltage requirements are grouped together. Each Protected Electrical Equipment(s) 160 retains its own Isolation Device Configuration 500, but only one Isolation Device Configuration 500 is required to power a given subgroup of Protected Electrical Equipment(s) 160 since all Protected Electrical Equipment(s) 160 in the subgroup require the same voltage. This is illustrated by the subgroupings PEE 1 to PEE J, PEE (J+!) to PEE L, etc., to PEE(M−K) to PEE (M). A subgroup may be any size. SPSS Power Bus 1010 connects together the outputs of all input paths as one common bus. Subgroup Common Power Bus 1020 and Subgroup Common Power Bus 1030 distribute the output of the power conditioner to the output paths.

Figure 11:
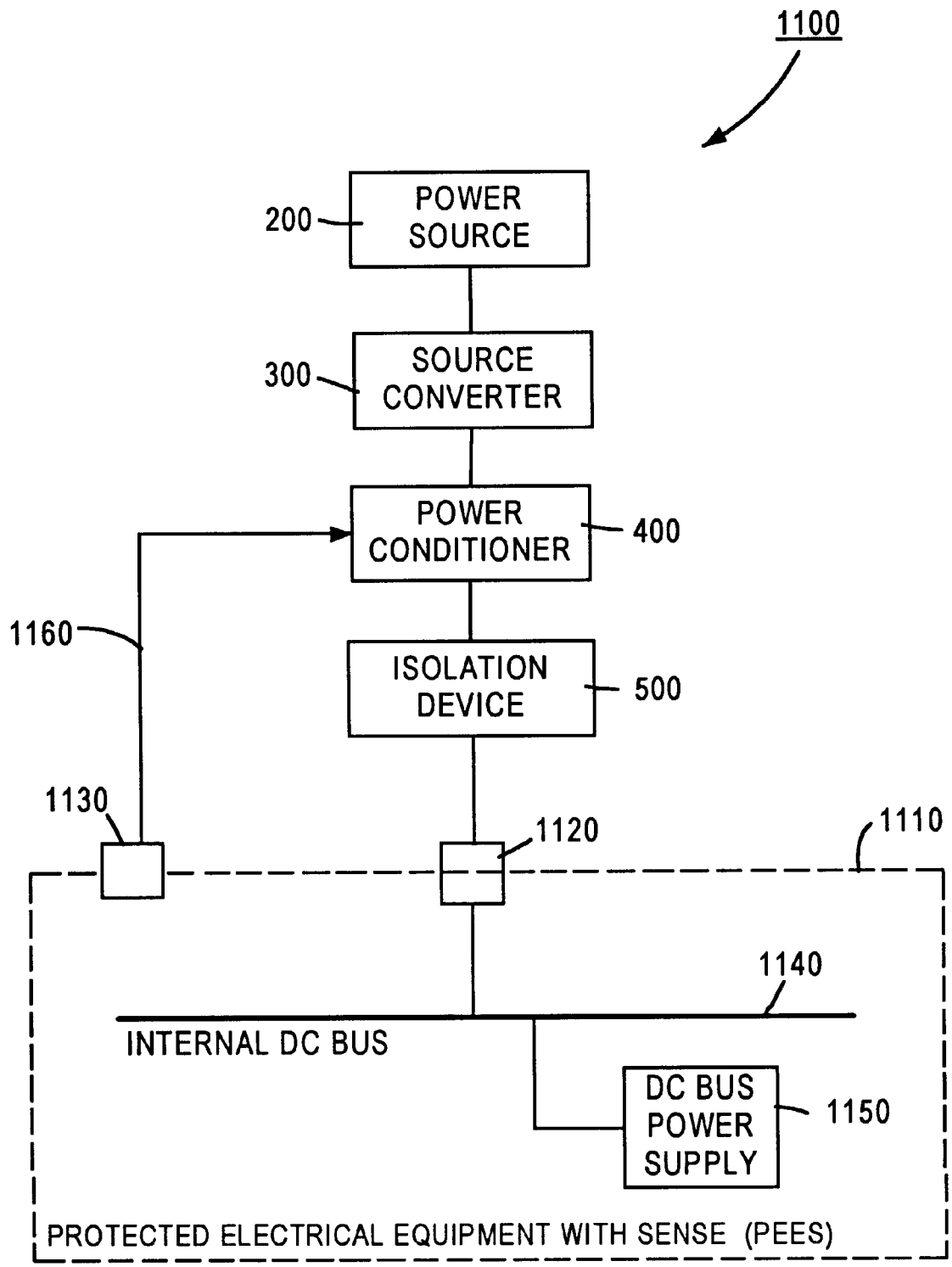
FIG. 11 is a block diagram of a SPSS application with one power source and one PEE, according to a seventh embodiment of the present invention.

Referring to FIG. 11, Block Diagram 1100 presents a SPSS similar to that depicted in Block Diagram 100 with the addition of feedback from Internal PEE DC Bus 170 of Protected Electrical Equipment(s) 160 utilized to control Power Conditioner Configuration 400, according to a seventh embodiment of the present invention. This is presented in Block Diagram 1100 as feedback from Internal PEES DC Bus 1140 to Power Conditioner 400 via Connection 1130 and Sense Connection Path 1160. Protected Electrical Equipment with Sense 1110 is composed of Internal PEES Power Supply 1150, Internal PEES DC Bus 1140, Connection 1120 and Connection 1130. Internal PEES Power Supply 1150 is the power supply internal to Protected Electrical Equipment with Sense 1110 which powers Internal PEES DC Bus 1140. Connection 1120 is a connection point of Protected Electrical Equipment with Sense 1110, and may be manufactured into the equipment or may be the result of an equipment modification. Connection 1130 is a connection point of Protected Electrical Equipment with Sense 1110, and may be manufactured into the equipment or may be the result of an equipment modification.

Connection 1120 routes power from the SPSS to Protected Electrical Equipment with Sense 1110, and Connection 1130 routes a sample of Internal PEES DC Bus 1140 voltage out of Protected Electrical Equipment with Sense 1110 for external equipment. Connection 1130 is routed to Power Conditioner Configuration 400 via connection Sense Connection Path 1160. When the SPSS is supplying power to Protected Electrical Equipment with Sense 1110, the SPSS can regulate the voltage present at Internal PEES DC Bus 1140 in a conventional manner utilizing remote sense methods. The particular Power Conditioner 400 selected from the available power conditioner configurations shown in FIG. 4 must have external sense capability. Internal PEES DC Bus Power Supply 1150 powers the internal DC bus. Sense Path 1160 routes the sense sample to the power conditioner.

Figure 12:
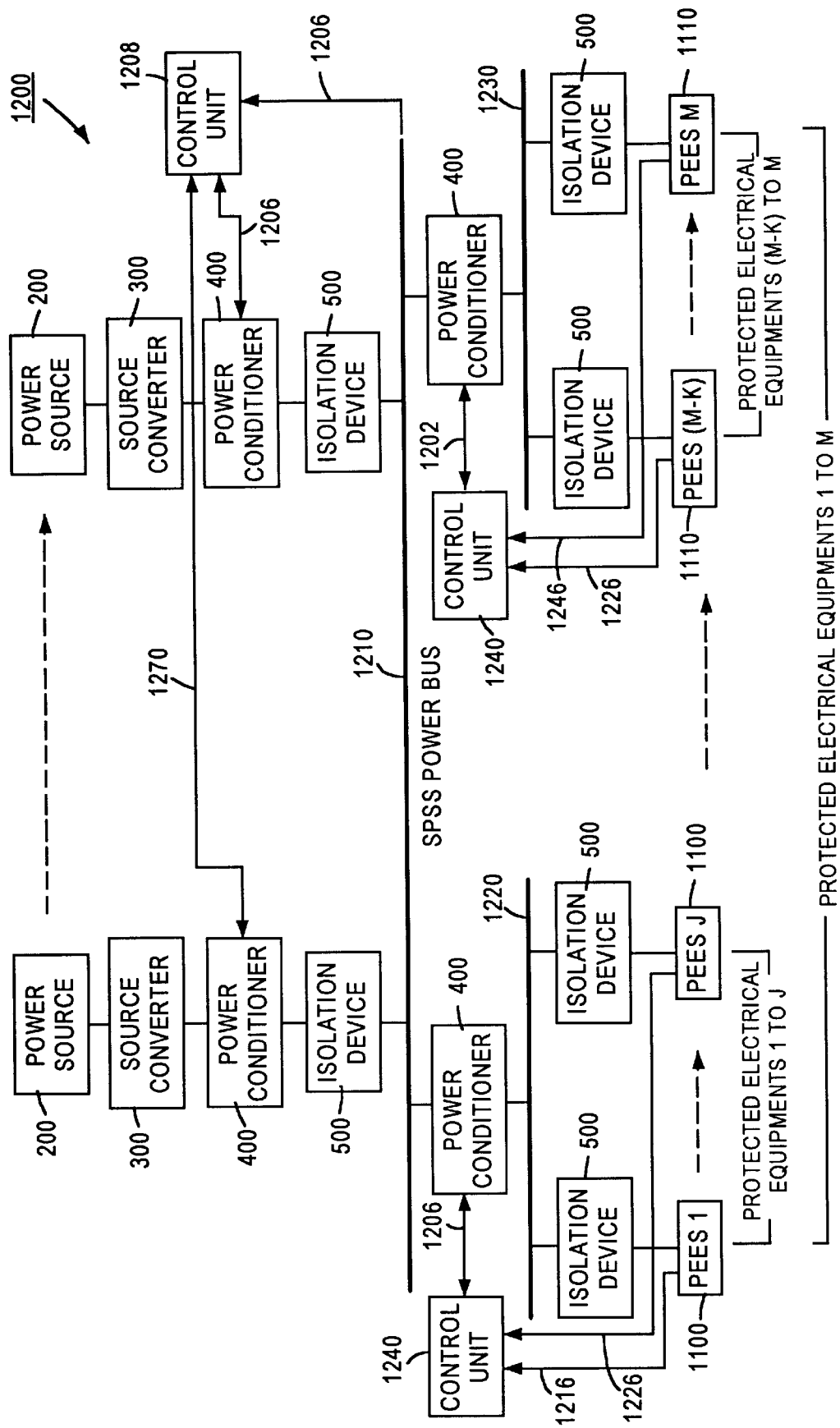
FIG. 12 is a block diagram of a SPSS application with one to N Power Sources and One to M PEE, according to an eighth embodiment of the present invention.

Referring to FIG. 12, Block Diagram 1200 presents an SPSS system which can protect any number of Protected Electrical Equipment with Sense 1110 utilizing any number of Power Source 200, according to an eighth embodiment of the present invention. The Protected Electrical Equipment with Sense 1110 have been grouped. Operation of this system is very similar to that of FIG. 10; please refer to that section for a description of basic operation. Provision is made for individual regulation of each subgroup of Protected Electrical Equipment with Sense 1110. For example, the subgroup 1 to J has Sense Connection Path 1225, Sense Connection Path 1215, Subgroup Control Unit 1240, Control/Status Path 1205 and Power Conditioner 400 (capable of remote sense). Subgroup (M–K) to M similarly contains Sense Connection Path 1245, Sense Connection Path 1255, Subgroup Control Unit 1250, Control/Status Path 1292 and Power Conditioner 400 (capable of sense).

The regulation of all subgroups is similar in operation, and only one will be described. The sense connections Sense Connection Path 1215, Sense Connection Path 1225 are shown as dotted lines, which means that any number may actually be present. Subgroup Control Unit 1240 is present if any sense lines are utilized. Control/Status Path 1205 is present if Subgroup Control Unit 1240 is present. Each sense line routes a sample of the Internal PEES DC Bus 1140 of the particular Protected Electrical Equipment with Sense 1110 to Subgroup Control Unit 1240. Subgroup Control Unit 1240 may utilize these input samples in various ways, such as controlling regulation such that an average value of all input samples is maintained, or regulate such that all lines are above some minimum sample value. The operational requirements for Subgroup Control Unit 1240 are determined by system design considerations. Control/Status Path 1205 interconnects Subgroup Control Unit 1240 and Power Conditioner Configuration 400, and routes control information to Power Conditioner Configuration 400 and status information from Power Conditioner Configuration 400 to Subgroup Control Unit 1240. As pointed out, other subgroups function in a similar manner. Note that Subgroup Control Unit 1240 is dotted, and does not have to be present in a particular subgroup.

Another regulation loop is presented in Block Diagram 1200. This loop regulates SPSS Power Bus 1210, and consists of Sense Connection Path 1290, Control Unit 1260, Control/Status Path 1280 and Control/Status Path 1270. Control/Status Path 1270 and Control/Status Path 1280 route power conditioner status, such as on-off line and current draw, to Control Unit 1260, and route regulation control signals from Control Unit 1260 to Power Conditioner 400. Sense Connection Path 1290 routes a sample of the voltage at SPSS Power Bus 1210 to Control Unit 1260. Control Unit 1260 operates in a manner determined by system performance requirements. The SPSS can regulate the voltage present on SPSS Power Bus 1210 by controlling a Power Conditioner 400 or combination of Power Conditioners 400 which are supplying power to SPSS Power Bus 1210. Such control is important for critical voltage requirements. As the electrical power requirements change for the Protected Electrical Equipment with Sense 1110, the SPSS can control power sharing between the Power Source Configuration(s) 200 paths that are active. Note also that Control/Status Path 1270, Control/Status Path 1280, Control Unit 1260 and Sense Connection Path 1290 are dotted and are only present to the extent required.

It can be seen from the above Description of the Invention that an automatic backup power transfer system has been described which does not introduce power transfer anomalies into the operating power bus system of the protected electrical equipment. Power interruptions do not occur because, as the internal equipment power bus voltage decreases below a predetermined voltage level, the system of the present invention starts to provide supplemental backup bus current as soon as the voltage drops below the predetermined voltage level.

The present invention solves prior art deficiencies in a simple, straightforward and economical manner and thus provides advantages over other proposed solutions such as an EBT device which would require sophisticated electronics in order to accomplish transfer between asynchronous power sources. Prior art systems which utilize ABT devices and MBT devices and thus have inherent power interruption between AC power sources also are no longer necessary since the present invention will maintain power during transfer of the ABT devices and MBT devices. The present invention is simpler, less expensive and less complex than other proposed solutions. Additionally, the present invention operates automatically but does not have a delay time in transferring between power sources characteristic of prior art ABT devices.

While the invention has been particularly shown and described with reference to a preferred embodiment, it will be understood by those skilled in the art that various changes in form and detail may be made therein without departing from the spirit and scope of the invention.

What is claimed is:

1. A power transfer system for providing backup electrical power to a single protected electrical load through an internal power bus receiving operating electrical power from a primary power source, comprising:

a secondary power source for supplying electrical power; and a single isolation device for isolating the secondary power source from the protected electrical equipment and to permit the secondary power source to provide current to said power bus to said single protected electrical load when the voltage level applied to the power bus drops below a predetermined level.

2. The system of claim 1, further comprising:

a source converter element for converting a power source voltage provided by either the primary or secondary power source to a direct current voltage;

a power conditioner element for conditioning the voltage to be converted by the source converter element to a voltage level compatible with the internal power bus of the protected electrical load.

3. The system of claim 1, further comprising:

a connection element of the protected electrical equipment; and an electrical path internal to the protected electrical equipment which connects the connection element of the protected electrical equipment to the direct current power bus of the protected electrical equipment, wherein when the voltage level generated by the primary power source falls below a predetermined voltage level, the power source voltage is provided to the connection element of the protected electrical equipment and the electrical path internal to the protected electrical equipment supplies the power source voltage to the direct current power bus of the protected electrical equipment.

4. The system of claim 1, wherein the protected electrical equipment is part of a shipboard electrical system.

5. The power transfer system of claim 1, wherein said single isolation device is a silicon diode.

6. The power transfer system of claim 1, wherein said single isolation device is a silicon controlled rectifier.

7. The power transfer system of claim 1, wherein said single isolation device is a silicon diode biased in a reverse direction.

8. The power transfer system of claim 1, wherein said single isolation device is a series combination of a zener diode and a diode.

9. The power transfer system of claim 8, wherein said zener diode is biased in a forward direction and said diode is biased in a reverse direction.

10. The power transfer system of claim 8, wherein said zener diode is biased in a reverse direction and said diode is biased in a forward direction.

11. A power transfer system for providing backup electrical power to a single protected electrical load through an internal power bus receiving operating electrical power from a primary power source, comprising:

a secondary power source for supplying electrical power; and a source converter element for converting a power source voltage provided by either said primary or secondary power source to a direct current voltage;

a power conditioner element for conditioning the voltage provided by the source converter element to a voltage level compatible with a direct current power bus of a protected electrical equipment; and a single isolation device for isolating the secondary power source from the protected electrical equipment and to permit the secondary power source to provide current to said power bus to said single electrical load when the voltage level applied to the power bus drops below a predetermined level.

12. The device of claim 11, further comprising:

a connection element of the protected electrical equipment; and an electrical path internal to the protected electrical equipment which connects the connection element of the protected electrical equipment to the direct current power bus of the protected electrical equipment, wherein when the voltage level generated by the primary power source falls below a predetermined voltage level, the power source voltage is provided to the connection element of the protected electrical equipment and the electrical path internal to the protected electrical equipment supplies the power source voltage to the direct current power bus of the protected electrical equipment.

13. The device of claim 11, wherein the protected electrical equipment is part of a shipboard electrical system.

14. A power transfer system for providing backup electrical power to a single protected electrical load through an internal power bus receiving operating electrical power from a primary power source, comprising:

a secondary power source for supplying electrical current power; and a plurality of isolation elements connected together to form a node for receiving the power source voltage provided by the secondary power source to the single protected electrical load.

15. The system of claim 14, further comprising:

a source converter element connected to the output terminal of the power source which converts the power source voltage to a direct current voltage;

a power conditioner element which conditions the direct current voltage generated by the source converter element to a voltage level compatible with the direct current power bus of the protected electrical equipment.

16. The system of claim 14, further comprising:

a connection element of the protected electrical equipment; and an electrical path internal to the protected electrical equipment which connects the connection element of the protected electrical equipment to the direct current power bus of the protected electrical equipment, wherein when the voltage level generated by the primary power source falls below a predetermined voltage level the power source is provided to the connection element of the protected electrical equipment and the electrical path internal to the protected electrical equipment supplies the power source voltage to the direct current power bus of the protected electrical equipment.

17. The system of claim 14, wherein the protected electrical equipment is part of a shipboard electrical system.

18. A power transfer system for providing backup electrical power to a single protected electrical load through an internal power bus receiving operating electrical power from a primary power source, comprising:

a secondary power source for supplying electrical power;

a source converter element for converting the power source voltage to a direct current voltage;

a power conditioner element for conditioning the voltage provided by the source converter element to a voltage level compatible with a direct current power bus of a protected electrical equipment;

a single isolation device for isolating the secondary power source from the protected electrical equipment and to permit the secondary power source to provide current to said power bus to said single protected electrical load when the voltage level applied to the power bus drops below a predetermined level; and a voltage sensor which senses the voltage in the power bus.

19. The device of claim 18, further comprising:

a connection element of the protected electrical equipment; and an electrical path internal to the protected electrical equipment which connects the connection element of the protected electrical equipment to the direct current power bus of the protected electrical equipment, wherein when the voltage level generated by the primary power source falls below a predetermined voltage level, the power source voltage is provided to the connection element of the protected electrical equipment and the electrical path internal to the protected electrical equipment supplies the power source voltage to the direct current power bus of the protected electrical equipment.

20. The device of claim 18, wherein the protected electrical equipment is part of a shipboard electrical system.

21. The power transfer system of claim 18, wherein said voltage sensor provides a feedback control signal to said power conditioner element to regulate the voltage level in the power bus.

22. A method of providing backup electrical power to a single protected electrical load through an internal power bus receiving electrical operating power from a primary power source, the method comprising:

isolating the protected electrical load from a secondary power source using a single isolation device;

sensing that the voltage level in the power bus has dropped below a predetermined level and permitting the secondary power source to provide electrical power to the power bus through the single isolation device.

23. The method of claim 22, comprising converting voltage from the secondary power source to DC voltage.

24. The method of claim 22, comprising conditioning voltage from the second power source to a predetermined voltage level.

* * * * *